United States Patent [19]

Kwon et al.

[11] Patent Number: 4,796,116

[45] Date of Patent: Jan. 3, 1989

[54] COMPACT CASSETTE TYPE VIDEO TAPE RECORDER HAVING SINGLE ACTUATING PLATE

[75] Inventors: Sung T. Kwon, Kyungki; Jung Hyuk Choi, Seoul, both of Rep. of Korea

[73] Assignee: Gold Star Co., Ltd., Seoul, Rep. of Korea

[21] Appl. No.: 943,687

[22] Filed: Dec. 19, 1986

[30] Foreign Application Priority Data

Dec. 19, 1985 [KR] Rep. of Korea .............. 17154/1985
Dec. 31, 1985 [KR] Rep. of Korea .............. 10130/1985

[51] Int. Cl.⁴ ............................................. G11B 15/66
[52] U.S. Cl. .......................................... 360/85; 360/95
[58] Field of Search .................. 360/85, 84, 95, 130.22, 360/130.23

[56] References Cited

U.S. PATENT DOCUMENTS

| | | | |
|---|---|---|---|
| 4,635,146 | 1/1987 | Koda et al. | 360/85 |
| 4,661,864 | 4/1987 | Kuwajima | 360/95 X |
| 4,685,008 | 8/1987 | Ohyama | 360/85 |

Primary Examiner—John H. Wolff
Attorney, Agent, or Firm—Birch, Stewart, Kolasch & Birch

[57] ABSTRACT

A video cassette recorder having a slim VCR body which includes a loading motor disposed on a deck and a slideable actuating plate disposed on the deck having integrally formed thereon various actuating elements for actuating various tape cassette mechanisms. A mode conversion connecting gear for connecting or disconnecting a gear for driving a tape cassette loading mechanism is engaged with or disengaged from the actuating plate.

9 Claims, 9 Drawing Sheets

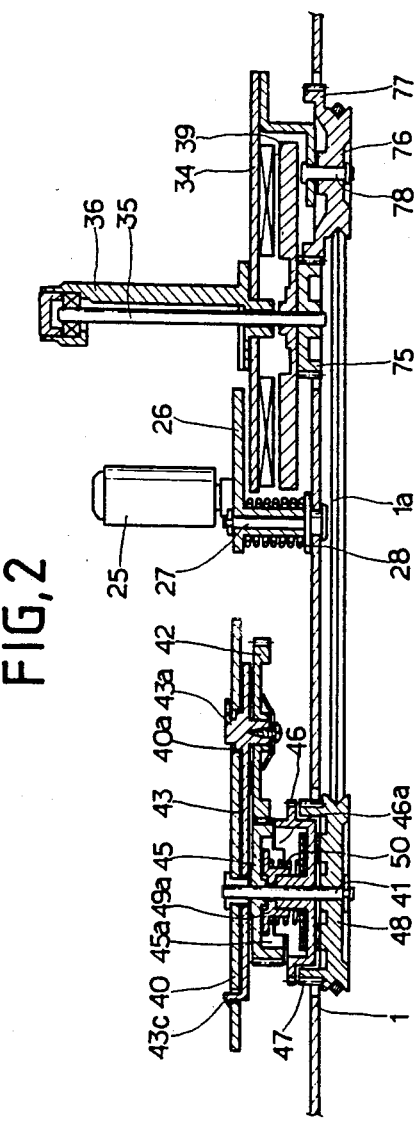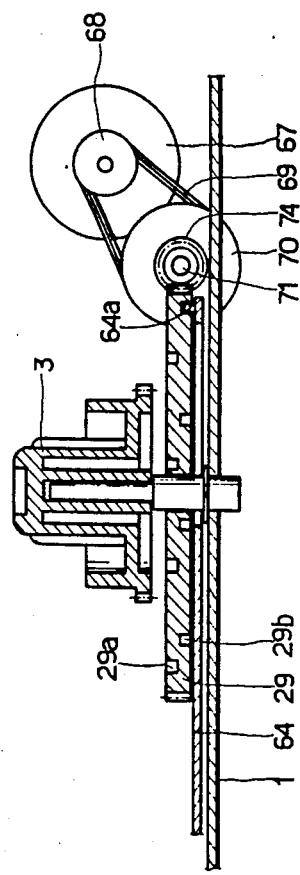

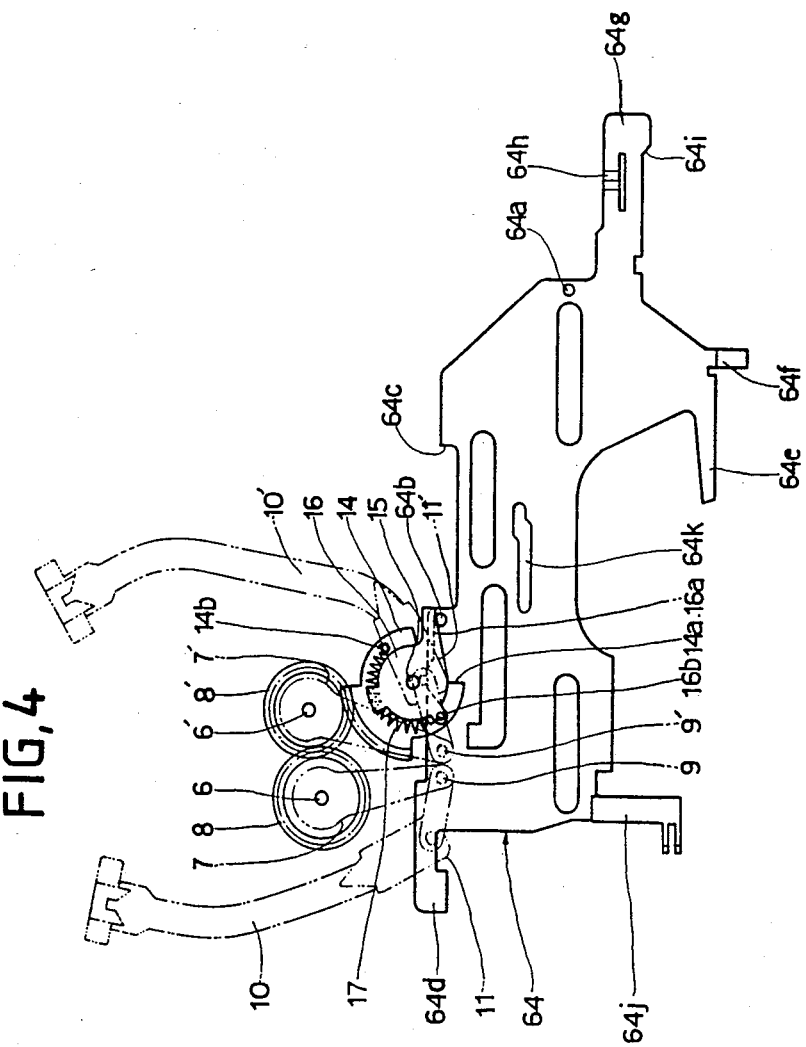

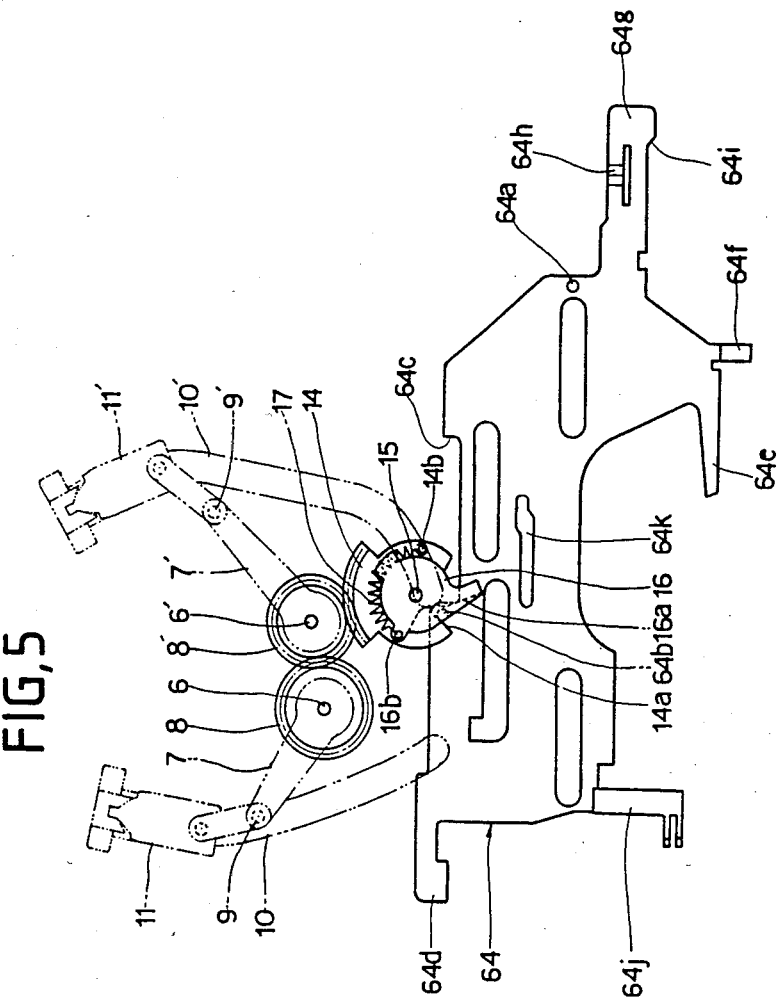

FIG, 6A
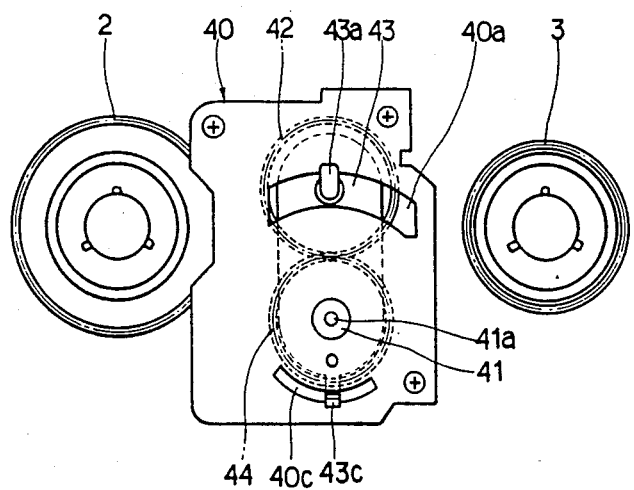
FIG, 6B
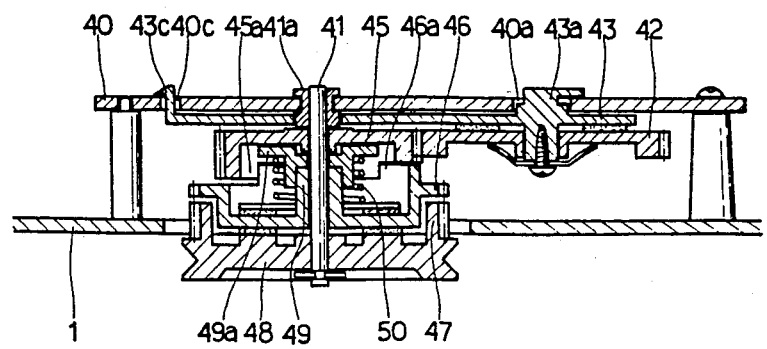

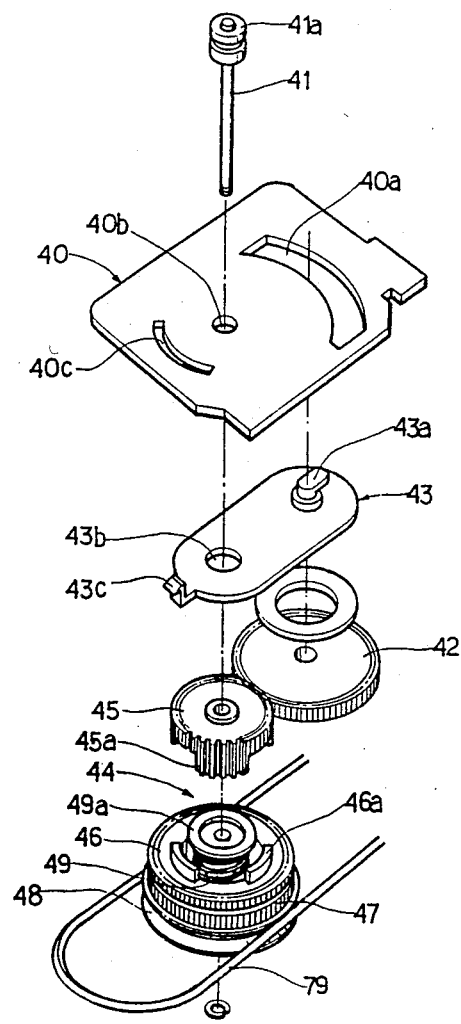
FIG, 6C

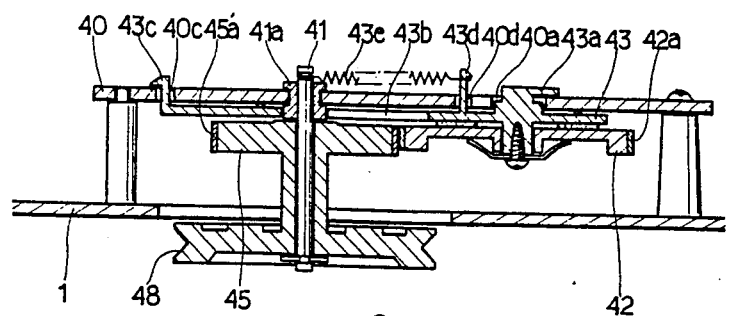
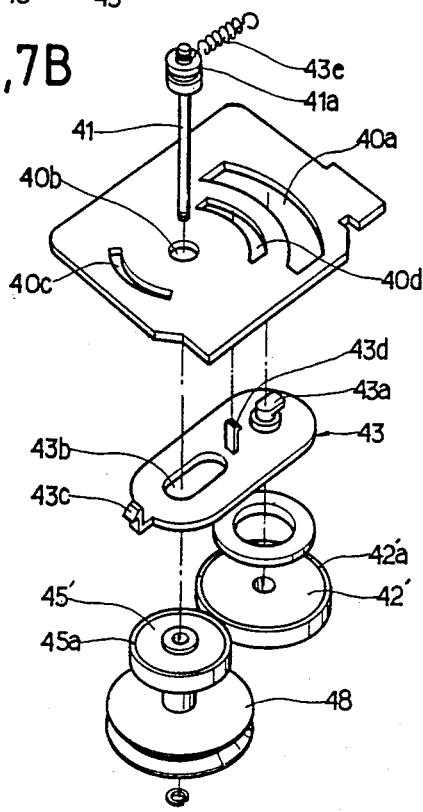

COMPACT CASSETTE TYPE VIDEO TAPE-RECORDER HAVING SINGLE ACTUATING PLATE

FILED OF THE INVENTION

This invention relates to a deck mechanism of a cassette type video tape recorder (hereinafter, referred to as VCR), more particularly to a simplification of various operating components and to improving the compactness of a VCR.

DESCRIPTION OF THE PRIOR ART

Many efforts for reducing the number of required components and thus compacting a VCR have been made for a long time.

Referring first to conventional installation patterns of a loading motor, mode conversion cam, and actuating plate, there is an installation pattern in which the loading motor is installed in a corner and driving force thereof is transferred to tape loading mechanism by means of a plurality of gears, pulleys and belts. However, since the distance between loading motor and tape loading mechanism is so far, it is inevitable that the number of gears, pulleys and belt is increased thus complicating the construction. There is another pattern in which a loading motor and mode conversion cam are installed in a corner of the deck and the driving force thereof is transferred to take-up reel by means of a plurality of levers. However, this also requires a complex force transferring mechanism for tape loading and an actuating plate and further lowers the reliability. There is still another pattern in which the loading motor is positioned in the vicinity of a supply reel table and the driving force thereof is directly transferred to a mode conversion cam by means of a worm gear connected thereto. However, it is necessary to provide a relatively large opening on the main base plate and adapt a special motor with a small diameter thereby requiring a large amount of production expense. There is still a further pattern in which a mode conversion cam is installed below the take-up reel table and a loading motor having a reduction gear head is directly connected to the mode conversion cam. However, this causes problems with regard to a larger required height of the VCR and a complex reduction gear head being required. Moreover, since it comprises a construction in which the various modes may be activated by moving an actuating plate installed below the main base plate by means of a mode conversion cam gear which is installed below the supply reel table, it is inevitable that apertures in places on the main base plate must be made which requires complex construction. Meanwhile, the actuating plate for use in conversion of a mode is generally installed across from the supply and take-up reel tables or in the vicinity of the supply reel table, since all the components for mode conversion are installed in the vicinity of the supply and take-up reel tables. An actuating plate and conversion cam for driving the actuating plate are generally installed below the deck in the prior art, and thereby the height of VCR body is increased and the construction thereof becomes complicated.

Referring now to the installation of a capstan shaft, there is a conventional pattern mainly adopted in a VHS type VCR in which the capstan shaft is installed in the mouth of a tape cassette and pressed by a pinch roller resided out of the mouth. If the outer periphery of the capstan motor or capstan flywheel is nearly adjacent to the take-up reel table shaft, a certain rotating body with a large diameter is installed in the vicinity of the take-up reel table, and the height of the of VCR body is necessarily increased for the superinterposed construction of the rotating body and capstan flywheel. Further, in the case wherein a capstan shaft with diameter of 3.53 mm, mainly used in recent constructions, is installed in the mouth of a tape cassette, the capstan shaft must be supported on the bottom thereof because of the lack of room for positioning a supporting means in the mouth, and thus the capstan shaft itself and the supporting portion on the bottom thereof comprise a rigid structure for sustaining the pressure force of the pinch roller. In case a capstan shaft of a large diameter is rotated for hours, the rotation rate becomes generally low and the Wow Flatter characteristic thereof becomes inferior with the use of a DD motor (direct drive motor). Also, since the capstan shaft must support itself at its lower end, it employs a ball bearing or other supporting means for opposing the trust load, and this causes a rise in production cost.

BRIEF SUMMARY OF THE INVENTION

It is therefore an object of this invention to provide a VCR which reduces the number of components required and thereby may be compacted in its size.

It is another object of this invention to provide a VCR which reduces the production cost and is improved with regard to its reliability.

Toward this end, the VCR according to the invention includes a loading motor disposed on a deck; a worm shaft for transmitting the driving force of the loading motor to a mode conversion gear having a cam groove and installed concentrically with a take-up reel table; an actuating plate integrally formed with actuating pins, step portions, pushing members, actuating members, a recess, and an actuating slot so as to operatively actuate various tape loading and running mechanisms to engage a cam curvature formed on the mode conversion gear, the actuating plate being movable over the surface of the deck.

BRIEF DESCRIPTION OF THE DRAWINGS

The above and other objects and advantages of the invention will be more apparent from the following description taken in connection with the appended drawings in which:

FIGS. 2 and 3 are longitudinal sectional views showing main components of the invention, FIGS. 4 and 5 are schematic plan views showing the construction and operation of the actuating plate according to the invention, FIGS. 6A, 6B and 6C illustrate an embodiment of the clutch device according to the invention, FIGS. 7A and 7B illustrate another embodiment of the clutch device shown in FIGS. 6A, 6B and 6C.

BEST MODE OF CARRYING OUT THE INVENTION

Figure 1:
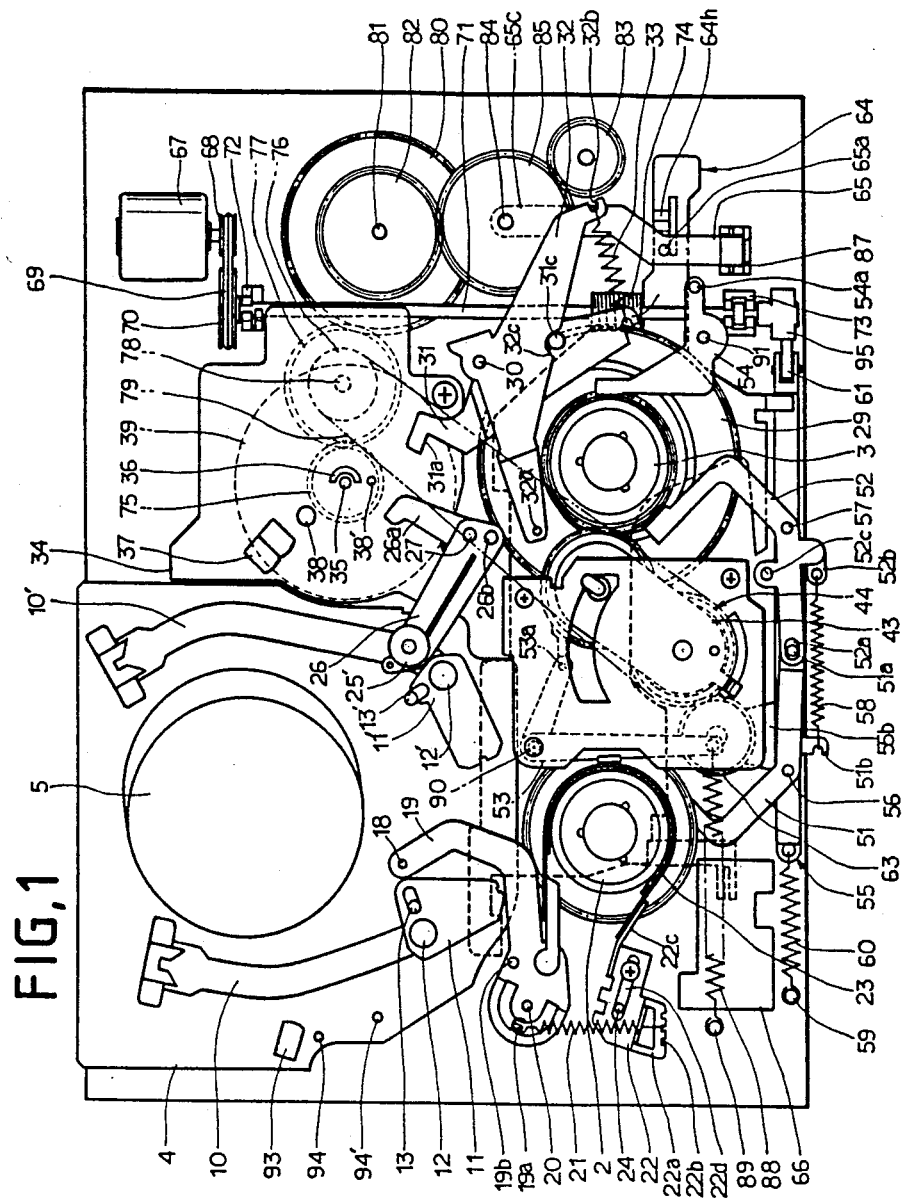
FIG. 1 is a plan view of the deck mechanism according to the invention.

Referring now to the drawings, particularly to FIG. 1, there is shown a plan view illustrating the arrangement of various components on a deck according to the invention. Installed on the front portion of a deck 1 are a supply reel table 2 and a take-up reel table 3. On the center portion of a loading plate 4, a head drum 5 is installed. Protruded downwardly from the loading plate 4 are axial pins 6 and 6' which are respectively interloceed with loading gears 8 and 8' fixed to each one end of loading levers 7 and 7' (shown in FIG. 4). Each loading lever comprises two lever members connected to each other by means of connecting prns 9 and 9', respectively. Trailors 11 and 11' which are respectively moved along guide grooves 10 and 10' formed on the loading plate 4 are affixed on the other end of each loading lever. On the trailors 11 and 11', guide rollers 12 and 12' and inclined guide pins 13 and 13' are fixed, respectively. Mounted on the deck 1 below the loading plate 4 is a sector gear 14 with an axial pin 15, which sector gear 14 is interlocked with the loading gear 8' in order to rotate the loading gears 8' and 8 and is provided with a slip face 14a. An auxiliary plate 16 with a slip face 16a is mounted on the sector gear 14. A coil spring 17 is connected between fixing protrusions 14b and 16b of the sector gear 14 and auxiliary plate 16 so that the slip faces 14a and 16a of the sector gear 14 and the auxiliary plate 16 form a generally V-shape figure therebetween. An actuating pin described hereinafter is positioned in the V-shape space between the slip faces 14a and 16a and is contacted along the faces 14a and 16a according to the movement of the actuating plate.

A tension arm 19 having a tension pin 18 at one end is mounted on the deck 1 with an axial pin 20. A coil spring 21 is provided so as to control the tension force of the tension arm 19, one end being engaged with a fixing protrusion 19a of the tension arm 19 and the other end being optionally engaged with one of V-shape control recesses 22b formed on a fixing portion 22a of a fixing member 22. A tension band 23 is wound around the supply reel table 2 with one end being engaged with an engaging portion 22c of the fixing member 22 and the other end being engaged with the tension arm 19. Formed below the fixing member 22 is an opening 22d which is adjustably fixed to a fixing protrusion 24 with a screw so that the fixing member 22 is optionally moved and fixed to a determined place.

As illustrated in FIGS. 1 and 2, a pinch roller arm 26 whose one end is mounted on the deck 1 with an axial pin having a coil spring 28 at its lower portion to bias the pinch roller arm 26 in the anti-clockwise direction and the other end is provided with a pinch roller 25 mounted thereon. The reference numeral 29 is a conversion gear which is rotatable concentrically with the take-up reel table 3 and formed with a generally spiral cam grooves 29a and 29b at its upper and lower surfaces. Mounted on an axial pin 30 (shown in FIG. 1) are a pressure element 31 having an extended connecting portion 31a and a fixing recess 31b, and an urging element 32 having an actuating pin 32a engaged with the upper cam groove 29a and a fixing recess 32b in the order named. A compression coil spring 33 is engaged with the fixing recesses 31b and 32b at its both ends. A side surface 32c of the urging element 32 is contacted to a contacting pin 31c formed on the pressure element 31 in such a manner that the side surface 32c presses the contacting pin 31c and pushes the pressure element 31 according to the urging element 32 being rotated by the rotation of the conversion gear 29.

A capstan housing 36 which houses a capstan shaft 35 is mounted on a capstan fixing plate 34 which is installed in the same level with the loading plate 4 on the deck 1. An audio head assembly 37 and guide posts 38 and 38' are affixed on the capstan fixing plate 34 and a motor 39 for driving the capstan shaft 35 is installed below the fixing plate 34.

Referring to FIGS. 1 and 6, a clutch gear fixing plate 40 formed with curved guide grooves 40a and 40c is provided between the reel tables 2 and 3. Mounted on an axle 41 having an expansion portion 41a and piercing an aperture 40b of the plate 40 are a pivoting lever 43 with a hole 43b at one end and a clutch device 44 below the fixing plate 40. The lever 43 is provided with engaging members 43a and 43c on its both ends which are respectively engaged with the guide grooves 40a and 40c of the plate 40 and is provided therebelow with a connecting gear 42 coaxial with the engaging member 43a, thereby the lever 43 may be moved, with the engaging members 43a and 43c being moved along the grooves 40a and 40c, according to the rotation of the clutch device 44 so that the connecting gear 42 is interlocked with a supply reel table 2 or a take-up reel table 3.

The clutch device 44 comprises an upper gear 45, an intermediate gear 46 and a main driving gear 47 as shown in FIGS. 2 and 6c. A pulley 48 is fixed below the main driving gear 47 which is integrally provided with a shaft bearing 49 having a contact element 49a, a coil spring 50 being wound around the shaft bearing 49 between the contact element 49a and the upper surface of the intermediate gear 46. Formed on the intermediate gear 46 is an annular interlocking element with a plurality of generally V-shape teeth 46a which are interlocked with a corresponding plurality of V-shape openings 45a formed among a plurality of extended portions of the upper gear 45.

Referring to FIGS. 7A and 7B, there is shown another embodiment of those shown in FIGS. 6A, 6B and 6C according to the invention. The fixing plate 40 may be further provided with a guide slot 40d which is engaged with an engaging member 43d of the lever 43. The hole 43b may be elongated and a coil spring 43e may be engaged with the engaging members 43c and 43d at its both ends. Further, the gears 42 and 45 of FIGS. 6A, 6B and 6C may be substituted by disks 42' and 45' having rubber rings 42'a and 45'a attached therearound, respectively, and the clutch device 44 shown in FIGS. 1, 6A, 6B and 6C may be omitted.

Figure 9A:
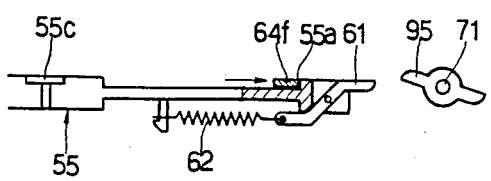
FIGS. 9A, 9B and 9C are operational elevational views illustrating the various operations of the brake lever mechanism shown in FIG. 8.
Figure 9B:
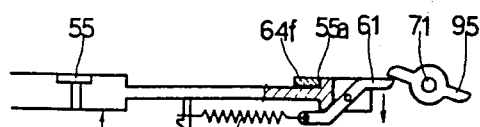

Turning to FIG. 1, there are shown main brakes at 51 and 52 for breaking the supply and take-up reel tables 2 and 3, respectively, a tension brake at 53 for smoothly pressurizing the tension band 23 to the supply reel table 2 and a soft brake at 54 for the take-up reel table 3. The main brakes 51 and 52 are pivotally fixed to a brake lever 55, transversely movable, with axial pins 56 and 57 respectively. The brakes 51 and 52 are connected to each other by means of a connecting pin 51a and a connecting slot 52a formed thereon. A coil spring 58 is engaged with extended elements 51b and 52b of the brakes 51 and 52 at its both ends. One end of the brake lever 55 is biased by means of a coil spring 60 whose one end is engaged with a fixing protrusion 59 formed on the deck 1, and the other end of the brake lever formed with a step portion 55a is provided with a ratchet 61 biased by means of a coil spring 62 formed below the brake lever 55 in such a manner that the ratchet 61 may be moved upwardly only (shown in FIG. 9). Mounted on extended pieces 55b of the lever 55 are lock gears 63 which are adapted to lock the clutch device 44.

Referring to FIGS. 1, 4 and 5, there is shown an actuating plate 64 which is provided with an actuating pin 64a engaged with the lower cam groove 29b of the conversion gear 29 and is moved according to the rotation of the conversion gear 29. The actuating plate 64 is provided with an activating pin 64b for activating the sector gear 14 and with a step 64c contacted with an actuating protrusion 26b of the pinch roller arm 26. A pushing element 64d contacted with an activating protrusion 19b of the tension arm 19 and an actuating piece 64e adapted to push an operating pin 52c of the main brake 52 are provided on the actuating plate 64. Formed adjacent the activating piece 64e is a pushing member 64f adapted to push the step portion 55a of the brake lever 55. Formed on an extended portion 64g are a recess 64h adapted to engage an engaging pin 65a of a moving lever 65, as will be described hereinafter, and a shoulder 64i adapted to contact an contacting pin 54 of the soft brake 54 and push the soft brake. The actuating plate 64 is further provided with a connecting piece 64j which renders effective or ineffective the contacts for various modes of a mode conversion switch 66 and is provided with an activating slot 64k to engage an engaging protrusion 53a of the tension brake 53 and to activate the tension brake 53.

A driving motor 67 is laid a side surface down on the deck 1. A driving pulley 68 is mounted on a rotating shaft of the driving motor 67 and is connected to a pulley 70 mounted on a worm shaft 71, extended from the driving motor 67, by means of a belt 69. The worm shaft 71 is supported on supporting members 72 and 73 and is provided with a worm 74 which is interlocked with the conversion gear 29. Thereby, if the worm 74 of the worm shaft 71 is rotated according to the rotation of the motor 67, the conversion gear 29 interlocked therewith may be rotated (shown in FIG. 3).

As illustrated in FIGS. 1 and 2, mounted on a rotating axle of the capstan motor 39 is a driving gear 75 interlocked with a main driving gear 77 which is integrally formed with a pulley 76 and is mounted on an axle 78 formed below the fixing plate 34. The pulley 76 of the main driving gear 77 is connected to a pulley 48 of the clutch device 44 by means of a belt 79 so that the clutch device 44 may be rotated with the rotation of the capstan motor 39. The pulleys 48 and 76 and the belt 79 are exposed through an exposure opening 1a formed on the deck 1 to facilitate the repairs and replacements. All the components are resided on the deck 1 except for the pulleys 48 and 76 and belt 79. An intermediate gear 80 interlocked with the main driving gear 77 is mounted on the deck 1 with an axial pin 81. Between an auxiliary gear 82 integrally formed on the intermediate gear 80 and a gear 83 mounted on the deck 1 with an axle, a connecting gear 85 is mounted on the deck 1 with an axle 84 in such a manner that they are interlocked to one another. Therefore, according to the rotation of the capstan motor 39, the gear 83 may be rotated, driving force of the gear 83 being used as a driving source of a tape cassette front loading mechanism. (not shown)

A moving lever 65 having an extended portion 65c at one end is positioned below the connecting gear 85 with an inserting slot 65b of the extended portion 65c being inserted onto the axle 84, and a coil spring is provided on the connecting gear 85 around the axle 84. The other end of the moving lever 65 is detachably fixed on a supporting element 87 and is provided with an engaging pin 65a which is adapted to engage the recess 64h of the actuating plate. According to the movement of the actuating plate 64, the engaging pin 65a of the lever 65 is engaged with or disengaged from the recess 64h and thus the extended portion 65c is rendered downward or upward movement. Thereby, the connecting gear 85 is rendered downward or upward so as to connect or disconnect the auxiliary gear 82 and the gear 83.

Figure 8:
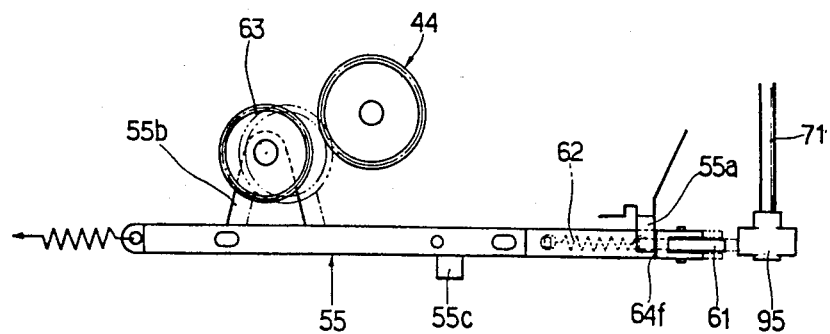
FIG. 8 is a schematic plan view of the brake lever mechanism of the invention.
Figure 9C:
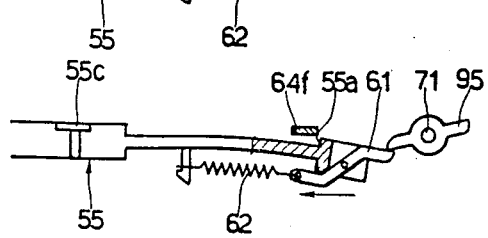

Referring to FIGS. 8 and 9, the reference numeral 55c is a pushing protuusion which is adapted to push the extended element 52b of the main brake 52 and thus to detach the main brakes 51 and 52 from the reel tables 2 and 3, respectively. In FIG. 1, the reference numeral 88 is a coil spring which is adapted to bias the tension arm 53 toward a fixing pin 89 to which the spring 88 is connected, the reference numeral 90 is an axial pin for mounting the tension arm and the reference numeral 91 is an axial pin for mounting a soft brake 54. Further, a screw 92 for securing the fixing member 22, a full width eraser head 93 and guide posts 94 and 94' are illustrated in FIG. 1. In FIGS. 8 and 9, the reference numeral 95 is a ratchet wheel adapted to urge the ratchet 61 downwardly as shown in FIG. 9C and thus to enable the brake lever 55 to suddenly move into the brake position.

Figure 10:
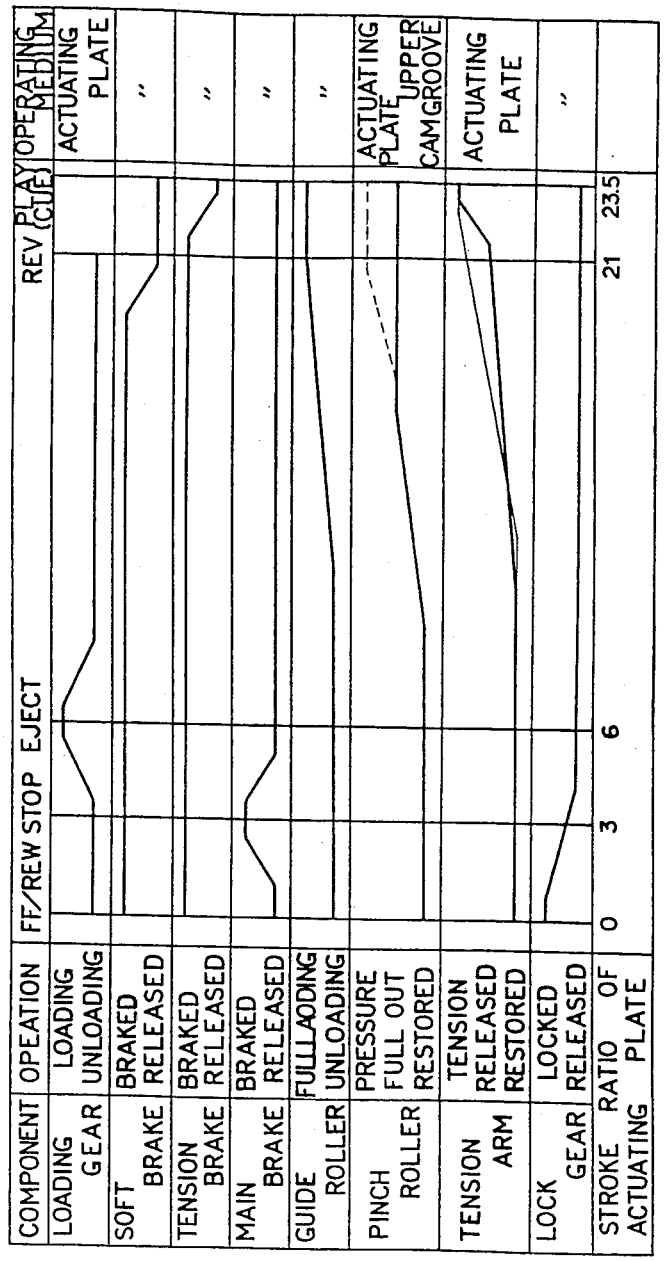
FIG. 10 is a graphical representation illustrating the operating status of various components on the deck, wherein horizontal line represents component being stationary and inclined line represents component being operated.

FIG. 10 is a graphical representation illustrating the operating status of various components on the deck, in which horizontal line represents component being stationary and inclined line represents component being operated.

Hereinafter, the operation of the invention will be described.

FIG. 1 illustrates the stop mode of the deck mechanism according to the invention, wherein the supply and take-up reel tables 2 and 3 are pressed by the tension brake 53 and soft brake 54, respectively. The clutch device 44 is detached from the lock gear 63. The moving lever 65 is in a raised position and thus the gear 83 for driving the tape loading mechanism is disconnected from the auxiliary gear 82. The connecting piece 64j of the actuating plate 64 is connected to a stop mode contact of the mode conversion switch 66.

According to the loading motor 67 being rotated, with FF(Fast Forward) or REW (Rewind) lever being pushed, the mode conversion gear 29 transferred with the driving force from the motor 75 through the pulleys 68 and 70, worm shaft 71 and worm 74 may be rotated and thus the actuating plate 64 is moved toward the right until the connecting piece 64j of the actuating plate 64 is connected to a FF or REW mode contact of the mode conversion switch 66. During such course, the step portion 55a of the brake lever 55 is pushed by the pushing member 64f of the actuating plate 64 from the state shown in FIG. 9A to the state shown in FIG. 9B, thereby the extended element 52b of the main brake is shoved by the pushing element 55f of the brake lever 55 so that the main brakes 51 and 52 are detached from the reel tables 2 and 3, respectively. Further, the lock gear 63 mounted on the extended piece 55b of the brake lever 55 is interlocked with the intermediate gear 46 and the main driving gear 47 of the clutch device 44 so that the driving force of the main driving gear 47 may be transferred to the connecting gear 42. If FF or REW signal is applied to the capstan motor 39, the capstan motor 39 is rotated in clockwise or counterclockwise direction so that the supply reel table 2 or the take-up reel table 3 may be rapidly rotated.

Then, when a stop signal is applied, the capstan shaft 35 is stopped and the loading motor 67 is rotated so that the worm shaft 71 and the worm 74 are rotated in counterclockwise direction. Thereby, the ratchet wheel 97 urges the ratchet 61 of the brake lever 55 downwardly and the step portion 55a may be disengaged from the pushing member 64f as shown in FIG. 9C so that the brake lever 55 may be rapidly restored by the restoring force of the coil spring 60. Accordingly, the pushing protrusion 55c of the brake lever 55 is detached from the extended element 52b of the main brake 52 and thus the supply and take-up reel tables 2 and 3 may be suddenly braked by the restoring force of the coil spring 58.

Further, when eject mode signal is applied, the actuating plate 64 is moved toward the left a predetermined distance from the position of stop mode, and the engaging pin 65a of the moving lever 65 is engaged with the recess 64h of the actuating plate 64. Thus, the moving lever 65 and the connecting gear 85 mounted thereto are in low position and the driving force of the capstan motor 39 may be transferred to the tape cassette loading mechanism through the gear 85 so that the eject mode may be effected.

When tape cassette is inserted in place and play signal is applied, the actuating plate 64 is further moved toward the left and thus the activating piece 64e of the actuating plate 64 is contacted with and slipped off the operating pin 52c of the main brake 52 to detach the main brakes 51 and 52 from the reel tables 2 and 3. Further, the activating pin 64b of the actuating plate 64 pushes the slip face 14a of the sector gear 14 so that the sector gear 14 is rotated in clockwise. Accordingly, the loading gears 8 and 8' interlocked with the sector gear 14 are rotated and thus the guide rollers 12 and 12' and the inclined guide pin 13 and 13' are transmitted into the full loading position along with a tape. Simultaneously, the pinch roller arm 26 is pushed by the step 64c of the actuating plate 64 and moved toward the capstan shaft 35. Also, the activating protrusion 19b of the tension arm 19 is pushed by the pushing element 64d and moved into the tension position. The tension brake 53 and the soft brake 54 are released by means of the activating slot 64k and the shoulder 64i, thereby play mode may be effected.

Further, the pressure element 31 biased to the urging element 32 by the coil spring 33 is moved in counterclockwise in accordance with the urging element 32 being moved in counterclockwise by means of the upper cam groove 29a of the conversion gear 29. Thereby, the connecting portion 26a of the pinch roller arm 26 is engaged with the connecting portion 31a of the pressure element 31 so that the pinch roller 25 presses the capstan shaft 35.

The driving force of the capstan motor 39 is transferred to the clutch device 44 through the driving gear 75, main driving gear 77, and pulleys 76 and 48 and makes the clutch device 44 rotate in clockwise. Accordingly, the lever 43 is rotated in counterclockwise and the connecting gear 42 is interlocked with the take-up reel table 3 so that the take-up reel table 3 may be rotated clockwise.

By controlling the rotation of the capstan motor 39 in play mode state, CUE or STILL mode may be achieved. In REV mode, the actuating plate 64 is slightly further moved in the right from the position of play mode so that the sott brake 54 is contacted with the take-up reel table 3 and the tension pin 18 is slightly moved in the right direction.

Obviously many modifications and variations of the present incwnrion are possible in the light of the above teachings. It is therefore to be understood that within the scope of the appended claims in the invention may be practiced otherwise than as specifically described.

What is claimed is:

1. A cassette type video tape recorder which includes tape cassette loading and running mechanisms comprising:
   a deck;
   a loading plate mounted on said deck;
   a head drum disposed on said loading plate;
   a loading motor disposed on said deck;
   a mode conversion gear rotatably mounted on said deck having first and second continuous cam grooves formed on opposite surfaces thereof for converting the modes of said recorder;
   a take-up reel table rotatably mounted in a coaxial and concentric manner on said mode conversion gear;
   a worm shaft rotatably mounted along the surface of said deck for transmitting the driving force of said loading motor to said mode conversion gear;
   an actuating plate slidably mounted over the surface of said deck so as to extend below said mode conversion gear and said loading plate, wherein said actuating plate is operatively connected to said first cam groove of said mode conversion gear so that said actuating plate actuates tape loading and running mechanisms of said recorder;
   a load moving lever having a first end pivotally mounted on said deck and a second end, said load moving lever being operatively connected to said actuating plate for engaging or disengaging said tape cassette loading mechanism;
   a load connecting gear rotatably mounted on said second end of said load moving lever;
   a load driving gear for driving said tape cassette loading mechanism, wherein said load driving gear is operatively engaged by and disengaged from said load connecting gear which is moved towards and away from said load driving gear by said load moving lever which is in turn engaged with or disengaged from said actuating plate.

2. A cassette type video tape recorder as set forth in claim 1, further comprising:
   a supply reel table rotatably mounted on said deck; and
   a capstan member rotatably mounted on said deck, said capstan member being rotatably in a clockwise or counterclockwise direction;
   a clutch device including,
      a clutch intermediate gear rotatably mounted on said deck between said supply and take-up reel tables, said clutch intermediate gear being driven by said load driving gear;
      a clutch upper gear coaxially mounted on said intermediate gear; and
      a clutch connecting gear operatively connected to said capstan member and said upper gear so as to be movable about said clutch upper gear, said clutch connecting gear being engageable with either said supply or take-up reel tables according to the rotation direction of said capstan member.

3. A cassette type video tape recorder as set forth in claim 2, further comprising:

a sector gear rotatably mounted on said deck and operatively engaged with said actuating plate so as to rotate upon the slidable movement of said actuating plate;

first and second loading gears rotatably mounted on said deck and engaged with one another so as to rotate in opposite directions, said first loading gear being rotatably engaged with said sector gear;

first and second loading levers each having a first end mounted on each of said first and second loading gears so as to rotate with said loading gears;

first and second loading trailors mounted on each of the second ends of said loading levers, said loading trailors being slidably mounted in first and second loading guide grooves for slidably moving in said loading guide grovves upon movement of said loading levers, wherein slidable movement of said actuating plate causes rotatable movement of said sector gear which in turn causes slidable movement of said loading trailors for loading and unloading said recorder.

4. A cassette type video tape recorder as set forth in claim 3, further comprising:

a main brake lever slidably mounted on said deck, and biased by a brake coil spring in a brake position, said main brake lever having disposed thereon a main brake extended element and a main brake step portion operatively engageable with said actuating plate;

a lock gear rotatably mounted on said main brake extended element and operatively engageable with said clutch device, wherein slidable movement of said actuating plate causes said main brake lever to slidably move from said brake position to a disengaged position so that said lock gear engages with said clutch device so as to drive said supply or take-up reel tables;

first and second main brake arms operatively connected to said main brake lever and pivotably engageable with said supply and take-up reel tables, wherein slidable movement of said actuating plate causing said main brake lever to slidably move into said disengaged position releases said main brake arms from pivotal engagement with said supply and take-up reel tables.

5. A cassette type video tape recorder as set forth in claim 4, further comprising:

a main brake lever ratchet mounted on one end of said main brake lever;

a worm shaft ratchet wheel rotatably mounted on one end of sasid worm shaft and operatively engageable with said main brake lever ratchet, wherein upon slidable movement of said actuating plate causing said main brake lever to slidably move into said disengaged position, said worm shaft ratchet wheel rotatably engages and pushes said main brake ratchet so as to release said main brake lever from said actuating plate, said main brake lever returning said brake position so that said first and second main brake arms pivotally engage said supply and take-up reel tables.

6. A cassette type video tape recorder as set forth in claim 1, further comprising:

a supply reel table rotatably mounted on said deck; and a capstan member rotatably mounted on said deck, said capstan member being rotatable in a clockwise or counterclockwise direction;

a clutch device including, a clutch drive pulley rotatably mounted on said deck between said supply and take-up reel tables, said clutch drive pulley being driven by said load driving gear;

a clutch upper disk coaxially mounted on said clutch drive pulley having an outer rubber edge; and a clutch connecting disk having an outer rubber edge operatively connected to said capstan member and said upper disk so as to be movable about said clutch upper disk, said clutch connecting disk being engageable with either said supply or take-up reel tables according to the rotatoon direction of said capstan member.

7. A cassette type video tape recorder as set forth in claim 6, further comprising:

a sector gear rotatably mounted on said deck and operatively engaged with said actuating plate so as to rotate upon the slidable movement of said actuating plate;

first and second loading gears rotatably mounted on said deck and engaged with one another so as to rotate in opposite directions, said first loading gear being rotatably engaged with said sector gear;

first and second loading levers each having a first end mounted on each of said first and second loading gears so as to rotate with said loading gears;

first and second loading trailors mounted on each of the second ends of said loading levers, said loading trailors being slidably mounted in first and second loading guide grooves for slidably moving in said loading guide grooves upon movement of said loading levers, wherein slidable movement of said actuating plate causes rotatable movement of said sector gear which in turn causes slidable movement of said loading trailors for loading and unloading said recorder.

8. A cassette type video tape recorder as set forth in claim 7, further comprising:

a main brake lever slidably mounted on said deck, and biased by a brake coil spring in a brake position, said main brake lever having disposed thereon a main brake extended element and a main brake step portion operatively engageable with said actuating plate;

a lock gear rotatably mounted on said main brake extended element and operatively engageable with said clutch device, wherein slidable movement of said actuating plate causes said main brake lever to slidably move from said brake position to a disengaged position so that said lock gear engages with said clutch device so as to drive said supply or take-up reel tables;

first and second main brake arms operatively connected to said main brake lever and pivotably engageable with said supply and take-up reel tables, wherein slidable movement of said actuating plate causing said main brake lever to slidably move into said disengaged position releases said main brake arms form pivotal engagement with said supply and take-up reel tables.

9. A cassette type video tape recorder as set forth in claim 8, further comprising:

a main brake lever ratchet mounted on one end of said main brake lever;

a worm shaft ratchet wheel rotatably mounted on one end of said worm shaft and operatively engageable with said main brake lever ratchet, wherein upon slidable movement of said actuating plate causing said main brake lever to slidably move into said disengaged position, said worm shaft ratchet wheel rotatably engages and pushes said main brake ratchet so as to release said main brake lever from said actuating plate, said main brake loever returning to said brake position so that said first and second main brake arms pivotally engage said supply and take-up reel tables.

* * * * *